(12) United States Patent
Koo et al.

(10) Patent No.: US 10,949,105 B2
(45) Date of Patent: Mar. 16, 2021

(54) DATA STORAGE DEVICE AND OPERATING METHOD OF THE DATA STORAGE DEVICE

(71) Applicant: SK hynix Inc., Icheon-si (KR)

(72) Inventors: Duck Hoi Koo, Suwon-si (KR); Seung Geol Baek, Seongnam-si (KR); Young Ho Kim, Seongnam-si (KR); Suk Ho Jung, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/660,651

(22) Filed: Oct. 22, 2019

(65) Prior Publication Data
US 2020/0249854 A1 Aug. 6, 2020

(30) Foreign Application Priority Data
Jan. 31, 2019 (KR) .......... 10-2019-0012769

(51) Int. Cl.
*G06F 3/06* (2006.01)
(52) U.S. Cl.
CPC ............ *G06F 3/0631* (2013.01); *G06F 3/068* (2013.01); *G06F 3/0616* (2013.01); *G06F 3/0653* (2013.01)
(58) Field of Classification Search
None
See application file for complete search history.

(56) References Cited

U.S. PATENT DOCUMENTS

| 8,601,202 | B1 * | 12/2013 | Melcher | G11C 16/349 |
| | | | | 711/103 |
| 2007/0260811 | A1 * | 11/2007 | Merry, Jr. | G11C 16/349 |
| | | | | 711/103 |
| 2009/0150640 | A1 | 6/2009 | Royer et al. | |
| 2009/0172340 | A1 | 7/2009 | Tang et al. | |
| 2011/0125954 | A1 | 5/2011 | Yeh et al. | |
| 2012/0131593 | A1 | 5/2012 | DePetro | |
| 2013/0124785 | A1 | 5/2013 | Xiong et al. | |
| 2014/0189302 | A1 | 7/2014 | Subbareddy et al. | |
| 2015/0234606 | A1 | 8/2015 | Im et al. | |
| 2016/0070601 | A1 | 3/2016 | Yamamoto et al. | |
| 2016/0357454 | A1 | 12/2016 | Lee et al. | |
| 2017/0277571 | A1 | 9/2017 | Yoo et al. | |
| 2019/0227618 | A1 | 7/2019 | Huang et al. | |
| 2019/0235762 | A1 | 8/2019 | Kaburaki et al. | |
| 2019/0384706 | A1 | 12/2019 | Kao | |
| 2020/0117368 | A1 | 4/2020 | Jiang et al. | |
| 2020/0233588 | A1 | 7/2020 | Li | |

FOREIGN PATENT DOCUMENTS

| KR | 1020150038386 A | 4/2015 |
| KR | 101516580 B1 | 5/2015 |
| KR | 101576575 B1 | 12/2015 |
| KR | 1020180052465 A | 5/2018 |
| KR | 1020200117256 A | 10/2020 |

* cited by examiner

*Primary Examiner* — Michael Alsip
(74) *Attorney, Agent, or Firm* — William Park & Associates Ltd.

(57) ABSTRACT

A data storage device may include: a memory device; and a controller configured to control an operation of the memory device. The controller may include a first CPU and a second CPU including a plurality of cores, wherein the first CPU compares P/E (Program/Erase) average counts for the plurality of cores of the second CPU, and performs a remapping operation of changing a core which is mapped to logical block addresses received from a host.

16 Claims, 9 Drawing Sheets

P/E ACT (P/E average count table)

| Core 0 | P/E average Count 0 |
|---|---|
| Core 1 | P/E average Count 1 |
| ⋮ | ⋮ |
| Core i-1 | P/E average Count i-1 |

FIG.5

CACT (core access count table)

| | | |
|---|---|---|
| LBAG0 | Core 0 access count | LBA#0 of LBAG0 |
| | Core 1 access count | LBA#1 of LBAG0 |
| | ⋮ | ⋮ |
| | Core i-1 access count | LBA#i-1 of LBAG0 |
| ⋮ | ⋮ | ⋮ |
| LBAGn | Core 0 access count | LBA#0 of LBAGn |
| | Core 1 access count | LBA#1 of LBAGn |
| | ⋮ | ⋮ |
| | Core i-1 access count | LBA#i-1 of LBAGn |

FIG.6

CMOT (core mapping offset table)

| | |
|---|---|
| LBAG0 | 0 |
| LBAG1 | 0 |
| ⋮ | ⋮ |
| LBAGn | 0 |

DATA STORAGE DEVICE AND OPERATING METHOD OF THE DATA STORAGE DEVICE

CROSS-REFERENCES TO RELATED APPLICATION

The present application claims priority under 35 U.S.C. § 119(a) to Korean application number 10-2019-0012769, filed on Jan. 31, 2019, in the Korean Intellectual Property Office, which is incorporated herein by reference in its entirety.

BACKGROUND

1. Technical Field

Various embodiments generally relate to an electronic device, and more particularly, to a data storage device and an operating method of the data storage device.

2. Related Art

Recently, the paradigm for the computing environment has changed to the ubiquitous computing environment in which computer systems can be used anytime anywhere. Therefore, the use of portable electronic devices such as mobile phones, digital cameras and notebook computers has rapidly increased. Such potable electronic devices generally use a data storage device using a memory device. The data storage device is used to store data which are used in the portable electronic devices.

Since a data storage device using a memory device has no mechanical driver, the data storage device has excellent stability and durability, high information access speed, and low power consumption. The data storage device having such advantages includes a universal serial bus (USB) memory device, a memory card having various interfaces, a universal flash storage (UFS) device, and a solid state drive (SSD).

SUMMARY

In an embodiment, a data storage device may include: a memory device; and a controller configured to control an operation of the memory device. The controller may include a first central processing unit (CPU) and a second CPU including a plurality of cores, wherein the first CPU compares Program/Erase (P/E) average counts for the plurality of cores of the second CPU, and performs a remapping operation of changing a core which is mapped to logical block addresses received from a host, when there is a first core and a second core, among the plurality of cores, that each have a P/E average count and a difference of the P/E average counts for the first core and the second core is equal to or more than a preset threshold value.

In an embodiment, there is an operating method of a data storage device which includes a memory device; and a controller configured to control an operation of the memory device and having a first central processing unit (CPU) and a second CPU including a plurality of cores. The operating method may include: comparing Program/Erase (P/E) average counts for the plurality of cores of the second CPU; checking whether there is a first core and a second core among the plurality of cores of the second CPU, that each have a P/E average count and a difference of the P/E average counts for the first core and the second core is equal to or more than a preset threshold value; and performing a remapping operation of changing a core which is mapped to logical block addresses received from a host, when there are the first core and the second core.

DETAILED DESCRIPTION

Hereinafter, a data storage device and an operating method of the data storage device according to the present disclosure will be described below with reference to the accompanying drawings through various embodiments.

Various embodiments may be directed to a data storage device capable of equalizing wear levels of storage regions allocated to respective cores, and an operating method of the data storage device.

Figure 1:
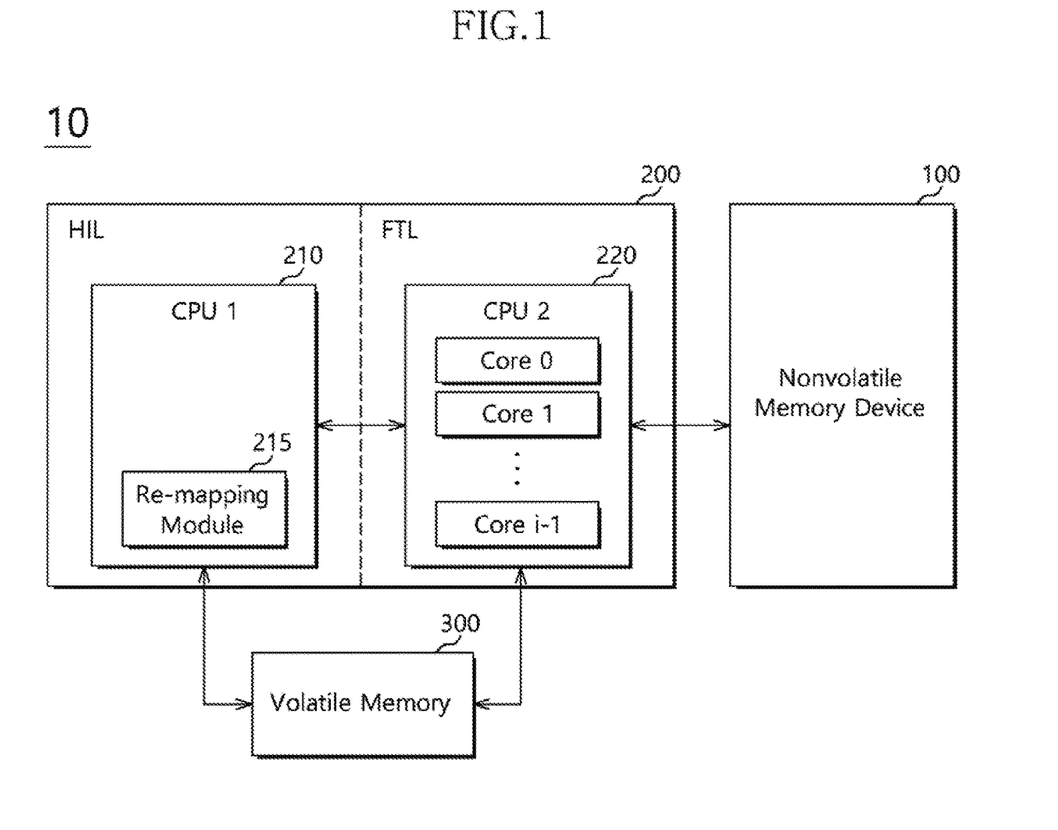
FIG. 1 illustrates a data storage device in accordance with an embodiment.

FIG. 1 illustrates a configuration of a data storage device 10 in accordance with an embodiment.

Referring to FIG. 1, the data storage device 10 in accordance with an embodiment may store data accessed by a host (not illustrated) such as a mobile phone, MP3 player, laptop computer, desktop computer, game machine, TV or in-vehicle infotainment system. The data storage device 10 may be referred to as a memory system.

The data storage device 10 may be fabricated as any one of various types of storage devices, depending on an interface protocol coupled to the host. For example, the data storage device 10 may be configured as any one of various types of storage devices which include an SSD (Solid State Drive), an MMC (Multi-Media Card) such as an eMMC, RS-MMC or micro-MMC, an SD (Secure Digital) card such as a mini-SD or micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-E (PCI Express) card-type storage device, a CF (Compact Flash) card, a smart media card and a memory stick.

The data storage device 10 may be fabricated as any one of various types of packages. For example, the data storage device 10 may be fabricated as any one of various types of packages such as a POP (Package-On-Package), SIP (System-In-Package), SOC (System-On-Chip), MCP (Multi-Chip Package), COB (Chip-On-Board), WFP (Wafer-Level Fabricated Package) and WSP (Wafer-Level Stack Package).

The data storage device 10 may include a nonvolatile memory device 100 and a controller 200.

The nonvolatile memory device 100 may operate as a storage medium of the data storage device 10. The nonvolatile memory device 100 may be configured as any one of various types of nonvolatile memory devices such as a NAND flash memory device, NOR flash memory device, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and ReRAM (Resistive Random Access Memory) using transition metal oxide, depending on memory cells.

For simplification of the drawing, FIG. 1 illustrates the nonvolatile memory device 100 as one block, but the nonvolatile memory device 100 may include a plurality of memory chips. An embodiment may be applied in the same manner to a data storage device 10 including the nonvolatile memory device 100 constituted by the plurality of memory chips.

The nonvolatile memory device 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each memory cell of the memory cell array may be configured as a single level cell (SLC) for storing 1-bit data therein, a multi-level cell (MLC) for storing 2-bit data therein, a triple level cell (TLC) for storing 3-bit data therein, or a quad level cell (QLC) for storing 4-bit data therein. The memory cell array 110 may include one or more of the SLC, the MLC, the TLC and the QLC. For example, the memory cell array 110 may include memory cells with a two-dimensional horizontal structure or memory cells with a three-dimensional vertical structure.

The controller 200 may control overall operations of the data storage device 10. The controller 200 may process requests received from the host. The controller 200 may generate control signals for controlling an operation of the nonvolatile memory device 100 based on the requests received from the host, and provide the generated control signals to the nonvolatile memory device 100. The controller 200 may include a host interface layer (HIL) and a flash translation layer (FTL).

The HIL of the controller 200 may include a central processing unit (CPU). For convenience of description, the CPU of the HIL may be referred to as a 'first CPU CPU1'. The FTL of the controller 200 may include a CPU. For convenience of description, the CPU of the FTL may be referred to as a 'second CPU CPU2'.

The first CPU 210 may be configured to interface the host and the data storage device 10 in response to a protocol of the host. Therefore, the first CPU 210 may be referred to as a protocol CPU. For example, the first CPU 210 may communicate with the host through any one protocol of USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and PCI-E (PCI express).

The first CPU 210 may receive commands transferred from the host, and schedule the received commands and provide the scheduled commands to the second CPU 220. The first CPU 210 may provide the second CPU 220 with logical block addresses LBA received with the commands from the host. At this time, when the second CPU 220 includes a plurality of cores, the first CPU 210 may provide the logical block addresses received from the host to the corresponding cores. This operation will be described with reference to FIG. 2.

The first CPU 210 may include a remapping module 215. The remapping module 215 may be driven by the first CPU 210 at a specific condition. The specific condition may indicate a condition in which remapping needs to be performed. In an embodiment, the specific condition may indicate the case in which there are two cores whose program/erase (P/E) average counts have a difference equal to or more than a preset threshold value, among a plurality of cores Core 0 to Core i−1 of the second CPU 220. The word "preset" as used herein with respect to a parameter, such as a preset threshold value and preset period etc., means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

When the specific condition is satisfied, that is, when there are two cores whose P/E average counts have a difference equal to or more than the preset threshold value, among the plurality of cores Core 0 to Core i−1, the first CPU 210 may drive the remapping module 215.

The remapping module 215 may select a remapping-target logical block address group among the plurality of logical block address groups, and change a core mapping offset for the remapping-target logical block address group. The core mapping offset may indicate an offset for deciding cores which are to be mapped to a plurality of logical block addresses included in a logical block address group, respectively.

The first CPU 210 may temporarily store data received from the host (for example, write data) in a volatile memory 300. The first CPU 210 may transfer data temporarily stored in the volatile memory 300 (for example, read data) to the host. For this operation, the controller 200 may further include a separate data transfer block (not illustrated) configured to transfer the write data received from the host to the volatile memory 300 or transfer the read data stored in the volatile memory 300 to the host, under control of the first CPU 210.

The second CPU 220 may include the plurality of cores Core 0 to Core i−1. Some storage regions of the nonvolatile memory device 100 may be allocated to the respective cores Core 0 to Core i−1. For example, the nonvolatile memory device 100 may include a plurality of storage regions, and one or more storage regions of the plurality of storage regions may be allocated as dedicated storage regions of the respective cores Core 0 to Core i−1. Each of the storage regions may indicate a die or memory chip.

Each of the cores Core 0 to Core i−1 may independently perform operation control and management on the dedicated storage region allocated thereto. For example, each of the cores Core 0 to Core i−1 may control the dedicated storage region such that a write operation, a read operation, an erase operation and the like are performed on the dedicated storage region. Furthermore, each of the cores Core 0 to Core i−1 may independently manage mapping information on the dedicated storage region, and independently perform garbage collection and wear-leveling on the dedicated storage region.

Each of the cores Core 0 to Core i−1 may control overall operations of the data storage device 10 by driving firmware or software loaded to the volatile memory 300 or an internal memory (not illustrated) of the controller 200. Each of the cores Core 0 to Core i−1 may decode and drive a code-based instruction or algorithm such as firmware or software. Therefore, each of the cores Core 0 to Core i−1 may also be referred to as an FTL (Flash Translation Layer) core.

The cores Core 0 to Core i−1 of the second CPU 220 may generate control signals for controlling an operation of the nonvolatile memory device 100 based on a command provided through the first CPU 210, and provide the generated control signals to the nonvolatile memory device 100. The control signals may include a command, address and operation control signal for controlling the nonvolatile memory device 100.

The plurality of cores Core 0 to Core i−1 may provide write data stored in the volatile memory 300 to the corresponding storage regions of the nonvolatile memory device 100, or store read data read from the corresponding storage regions in the volatile memory 300. For this operation, the controller 200 may further include a separate data transfer block (not illustrated) configured to transfer the write data stored in the volatile memory 300 to the nonvolatile memory device 100 or transfer the read data read from the nonvolatile memory device 100 to the volatile memory 300, under control of the plurality of cores Core 0 to Core i−1.

The volatile memory 300 may be configured as a random access memory (RAM) such as a dynamic RAM (DRAM), but the embodiments are not limited thereto. FIG. 1 illustrates only the volatile memory 300 installed outside the controller 200. However, the embodiments are not limited thereto, but the controller 200 may include a memory therein. The internal memory of the controller 200 may be a static RAM (SRAM), but the embodiments are not limited thereto.

The volatile memory 300 may be configured to temporarily store write data to be transferred to the nonvolatile memory device 100 from the host or read data to be transferred to the host from the nonvolatile memory device 100. Furthermore, the volatile memory 300 may be configured to store map data (or mapping information) on the nonvolatile memory device 100. In an embodiment, the map data and the mapping information may be interchangeably used. The internal configuration of the volatile memory 300 will be described below with reference to FIG. 3.

Figure 2:
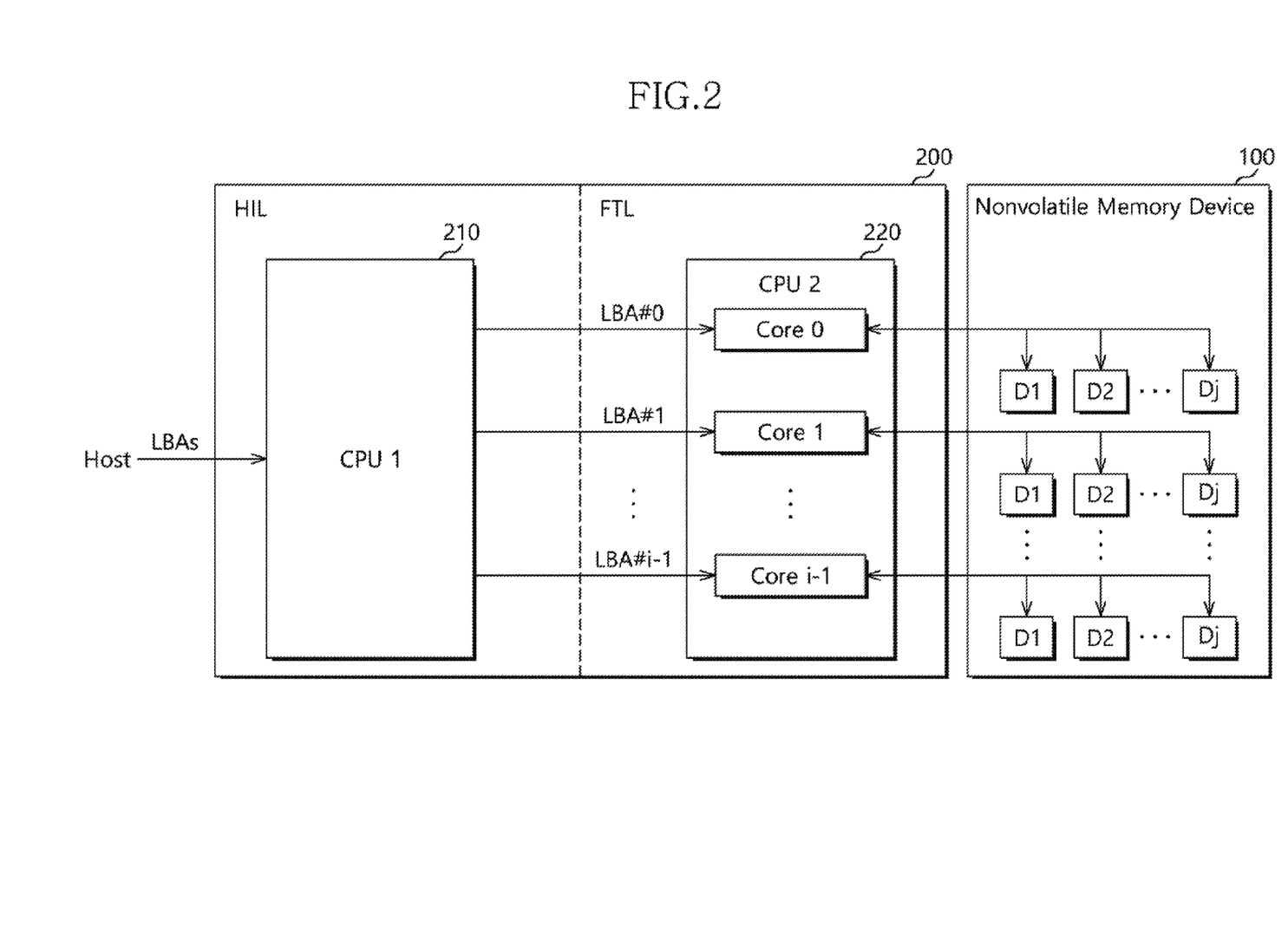
FIG. 2 illustrates that a first CPU of an HIL (Host Interface Layer) maps logical block addresses to respective cores of a second CPU of an FTL (Flash Translation Layer).

FIG. 2 illustrates that the first CPU 210 determines logical block addresses mapped to the respective cores Core 0 to Core i−1 of the second CPU 220, and provides the mapped logical block addresses to the respective cores Core 0 to Core i−1.

Referring to FIG. 2, the nonvolatile memory device 100 may include a plurality of dies D or a plurality of storage regions. At this time, j dies D1 to Dj may be allocated and coupled to each of the cores Core 0 to Core i−1 of the second CPU 220. Here, j may be a natural number equal to or more than 2. FIG. 2 illustrates that an equal number of dies, i.e. j dies D1 to Dj are allocated and coupled to each of the cores Core 0 to Core i−1 of the second CPU 220, but the numbers of dies allocated and coupled to the respective cores Core 0 to Core i−1 may be different from one another. Each of the cores Core 0 to Core i−1 of the second CPU 220 may independently perform operation control and management on the dies D1 to Dj allocated thereto.

The first CPU 210 may provide logical block addresses LBAs received from the host to the corresponding cores of the second CPU 220. In an embodiment, the first CPU 210 may determine a core to be mapped to a logical block address received from the host, using a modular arithmetic, and provide the received logical block address to the corresponding core.

For example, when the logical block address received from the host is 'LBA0', the first CPU 210 may determine that a remainder obtained by dividing the logical block address number '0' by the number of cores in the second CPU 220 (for example, 'i'), i.e. '0', is a core number to be mapped to the logical block address 'LBA0', and provide the logical block address 'LBA0' to the Core 0 of the second CPU 220. In this manner, the first CPU 210 may determine cores to be mapped to the respective logical block addresses received from the host, and provide logical block addresses corresponding to the respective cores. In FIG. 2, 'LBA #0', 'LBA #1' and 'LBA #i−1' may represent logical block addresses corresponding to remainders of '0', '1' and 'i−1', which are obtained by dividing logical block address numbers by the number of cores in the second CPU 220, respectively.

As such, the logical block addresses provided to the respective cores Core 0 to Core i−1 of the second CPU 220 may be decided by computation and fixed. Therefore, when a program command for a specific logical block address is repeatedly received from the host, the P/E count of a specific die among the dedicated dies of the core mapped to the specific logical block address may rapidly increase. As a result, the specific die of the core mapped to the specific logical block address may be worn faster than the dies allocated to the other cores. That is, the dies of the plurality of cores Core 0 to Core i−1 of the second CPU 220 may be non-uniformly worn, thereby having an influence on performance degradation.

Therefore, in an embodiment, logical block address remapping among cores may be performed at a specific condition. For example, the first CPU 210 may compare the P/E average counts of the plurality of cores Core 0 to Core i−1 of the second CPU 220 in each preset period, and check whether there are first and second cores whose P/E average counts have a difference equal to or more than the preset threshold value, among the plurality of cores Core 0 to Core i−1. When there are the first and second cores, the first CPU 210 may determine that the specific condition in which the logical block address remapping among the cores needs to be performed is satisfied, and drive the remapping module 215. Hereafter, for convenience of description, suppose that the P/E average count of the first core is larger than the P/E average count of the second core.

The remapping module 215 may select a logical block address group as a remapping-target logical block address group among the plurality of logical block address groups, the logical block address group satisfying a first condition in which the access count of the first core is larger than the access count of the second core and a second condition in which a difference between the access count of the first core and the access count of the second core is the largest. Furthermore, the remapping module 215 may reset a core mapping offset for changing cores mapped to the respective logical block addresses of the remapping-target logical block address group. Before resetting the core mapping offset, the remapping module 215 may provide the cores Core 0 to Core i−1 with an instruction for moving data stored in physical block addresses corresponding to the respective logical block addresses of the remapping-target logical block address group.

Figure 3:
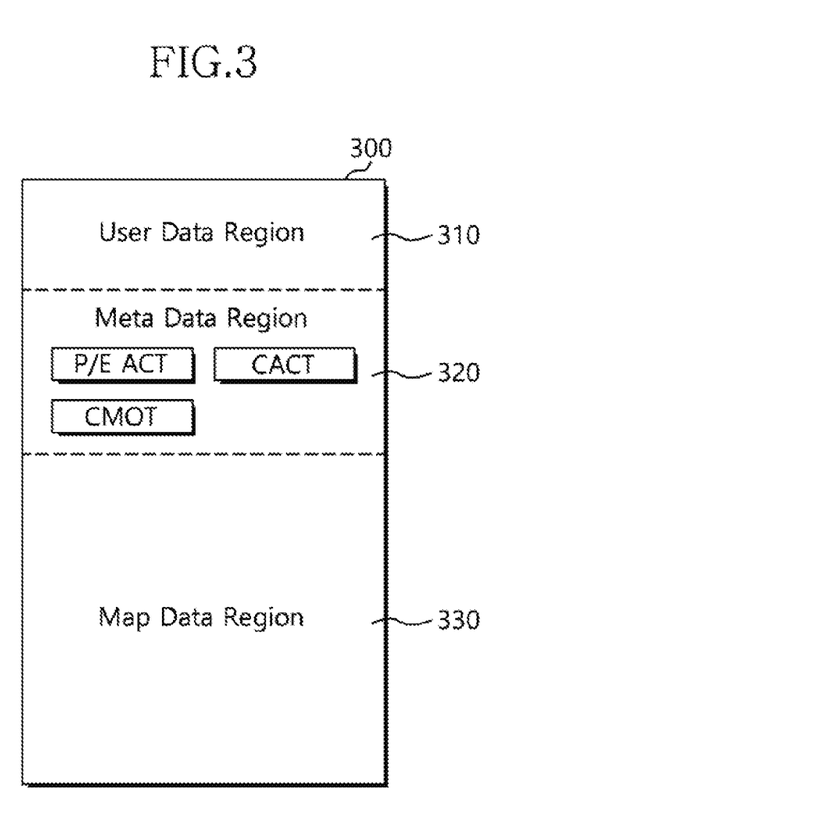
FIG. 3 illustrates a volatile memory of FIG. 1.

FIG. 3 illustrates the configuration of the volatile memory 300 of FIG. 1.

Referring to FIG. 3, the volatile memory 300 may include a user data region 310, a meta data region 320 and a map data region 330. The user data region 310 may temporarily store write data which are to be transferred from the host to the nonvolatile memory device 100 and read data which are read from the nonvolatile memory device 100 and will be transferred to the host. The meta data region 320 may store software such as firmware and meta data required for driving the software. The map data region 330 may store map data.

The meta data region 320 may store a P/E average count table P/E ACT, a core access count table CACT and a core mapping offset table CMOT. The P/E average count table P/E ACT may be configured to store the P/E average counts of the respective cores Core 0 to Core i−1 of the second CPU 220, the core access count table CACT may be configured to store access counts of each logical block address group for the respective cores Core 0 to Core i−1, and the core mapping offset table CMOT may be configured to store a core mapping offset for each logical block address group. The P/E average count table P/E ACT, the core access count table CACT and the core mapping offset table CMOT may be generated, stored and updated by the first CPU 210 of the HIL, but the embodiments are not limited thereto.

Figure 4:
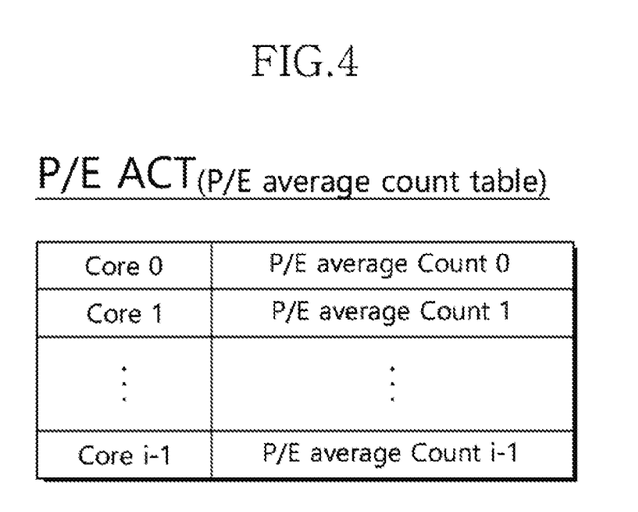
FIG. 4 illustrates a P/E (Program/Erase) average count table including P/E average counts of the respective cores included in the second CPU of the FTL.

The first CPU 210 may compare the P/E average counts of the respective cores Core 0 to Core i−1 by referring to the P/E average count table P/E ACT stored in the volatile memory 300 in each preset period, and check whether there are the first and second cores whose P/E average counts have a difference equal to or more than the preset threshold value, among the plurality of cores Core 0 to Core i−1. When there are the first and second cores, the first CPU 210 may drive the remapping module 215.

The P/E average count table P/E ACT may include the average value of the P/E counts of the dedicated dies (or storage regions) in each of the cores Core 0 to Core i−1.

Figure 5:
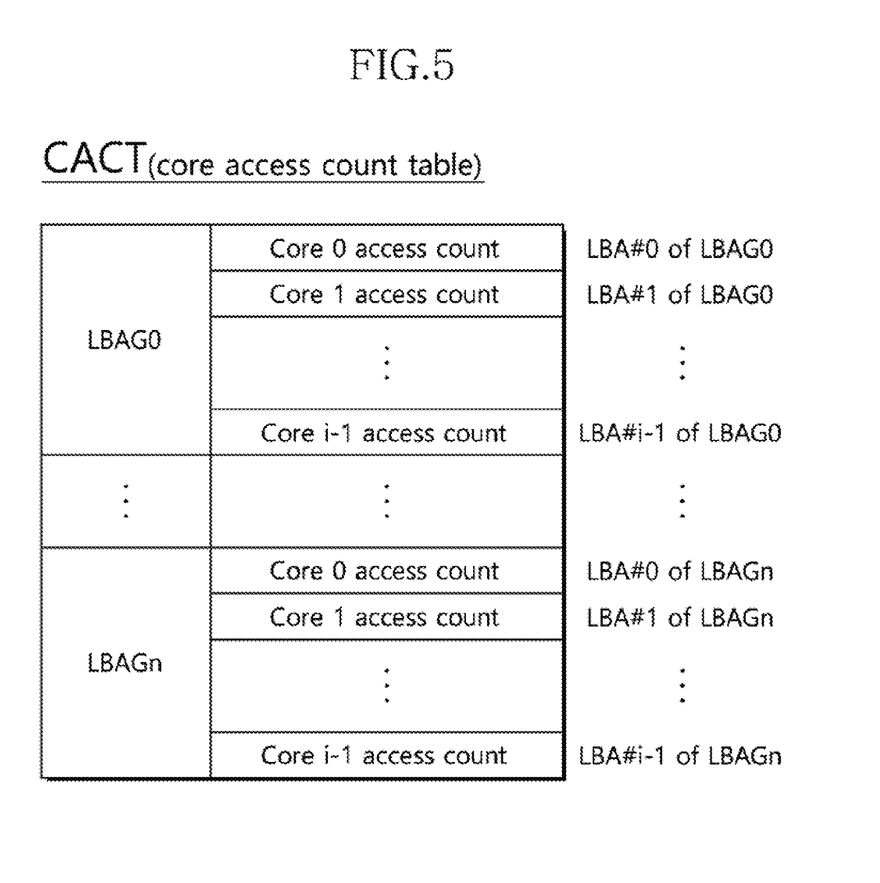
FIG. 5 illustrates a core access count table including per-core access counts of each logical block address group.

The remapping module 215 may select a logical block address group as a remapping-target logical block address group by referring to the core access count table CACT stored in the volatile memory 300, the logical block address group satisfying a first condition in which the access count of the first core is larger than the access count of the second core and a second condition in which a difference between the access count of the first core and the access count of the second core is the largest.

The core access count table CACT may include per-core access counts Core 0 access count to Core i−1 access count of each of the logical block address groups LBAG0 to LBAGn. One logical block address group may include a plurality of logical block addresses, and one or more logical block addresses of the plurality of logical block addresses may be mapped to each of the cores Core 0 to Core i−1. For example, referring to FIG. 5, one or more logical block addresses 'LBA #0' which have a value of '0' as a remainder obtained by dividing the logical block address number by the core number 'i', among the plurality of logical block addresses included in the logical block address LBAG0, may be mapped to 'Core 0'. Similarly, logical block addresses 'LBA #1' to 'LBA #i−1' which have values of '1' to 'i−1' as remainders obtained by dividing the logical block address numbers by the core number 'i', among the plurality of logical block addresses included in the logical block address group LBAGn, may be mapped to 'Core 1' to 'Core i−1', respectively.

Therefore, each of the per-core access counts Core 0 access count to Core i−1 access count illustrated in FIG. 5 may indicate the sum of access counts for the logical block addresses mapped to the corresponding core. For example, the access count of the core 'Core 0' in the logical block address group LBAG0 may indicate the sum of access counts for logical block addresses mapped to the core 'Core 0', among the logical block addresses included in the logical block address group LBAG0.

In an embodiment, when there are the first and second cores whose P/E average counts have a difference equal to or more than the preset threshold value (P/E count of first core>P/E count of second core), a logical block address group satisfying the first condition in which the access count of the first core is larger than the access count of the second core and the second condition in which the difference between the access counts of the first and second cores is the largest may be selected as the remapping-target logical block address group. The reason is that it is highly likely that the number of logical block addresses mapped to the first core in the corresponding logical block address group will continuously increase.

The remapping module 215 may provide the cores Core 0 to Core i−1 with an instruction for moving data to the dedicated die of the core to be remapped, the data being stored in physical block addresses corresponding to the respective logical block addresses of the remapping-target logical block address group. Each of the cores Core 0 to Core i−1 of the second CPU 220 may move the data to the core to be remapped according to the instruction of the remapping module 215. Therefore, the data stored in the respective cores before remapping may be invalidated.

When the data are completely moved, the remapping module 215 may reset a core mapping offset stored in the core mapping offset table CMOT and corresponding to the remapping-target logical block address group. For example, when the P/E average count of the first core is larger than the P/E average count of the second core, the first core may become a source core, and the second core may become a target core. That is, the remapping module 215 may perform remapping to map the logical block address mapped to the first core to the second core. For this operation, the remapping module 215 may reset an offset from the first core to the second core to the core mapping offset of the remapping-target logical block address group. In an embodiment, when the first core is 'Core 0' and the second core is 'Core 3', the offset is '3'. Therefore, the core mapping offset corresponding to the remapping-target logical block address group (for example, LBAG0) in the core mapping offset table CMOT of FIG. 6 may be reset to '3'.

Figure 6:
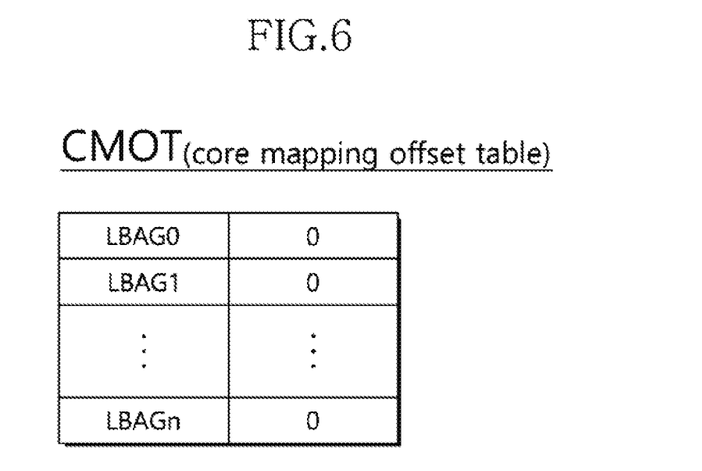
FIG. 6 illustrates a core mapping offset table including a core mapping offset for each of the logical block address groups.

Referring to FIG. 6, the default values of the core mapping offsets of the respective logical block address groups LBAG0 to LBAGn in the core mapping offset table CMOT generated at the initial stage may be set to '0'. Therefore, a logical block address received from the host before the remapping may be mapped to a core corresponding to a remainder obtained by dividing the logical block address number by the number of cores. Furthermore, a logical block address received from the host after the remapping may be mapped to a core corresponding to a remainder obtained by dividing a value by the number of cores, the value being obtained by adding the reset core mapping offset (for example, 3) to a remainder obtained by dividing the logical block address number by the number of cores.

For example, when it is assumed that the number of cores in the second CPU 220 is four (Core 0 to Core 3), the first core is 'Core 0', the second core is 'Core 3', and the P/E average count of the first core is larger than the P/E average count of the second core, the core mapping offset may be set '3'. Therefore, the logical block addresses 'LBA0, LBA4, LBA8, . . . ' which have been mapped to 'Core 0' before may be remapped to 'Core 3', the logical block addresses 'LBA1, LBA5, LBA9, . . . ' which have been mapped to 'Core 1' before may be remapped to 'Core 0', the logical block addresses 'LBA2, LBA6, LBA10, . . . ' which have been mapped to 'Core 2' before may be remapped to 'Core 1', and the logical block addresses 'LBA3, LBA7, LBA11, . . . ' which have been mapped to 'Core 3' before may be remapped to 'Core 2'.

When it is assumed that the P/E average count of the second core is larger than the P/E average count of the first core, the core mapping offset may be set to '1'. Therefore, the logical block addresses 'LBA0, LBA4, LBA8, . . . ' which have been mapped to 'Core 0' before may be remapped to 'Core 1', the logical block addresses 'LBA1, LBA5, LBA9, . . . ' which have been mapped to 'Core 1' before may be remapped to 'Core 2', the logical block addresses 'LBA2, LBA6, LBA10, . . . ' which have been mapped to 'Core 2' before may be remapped to 'Core 3', and the logical block addresses 'LBA3, LBA7, LBA11, . . . ' which have been mapped to 'Core 3' before may be remapped to 'Core 0'.

Figure 7:
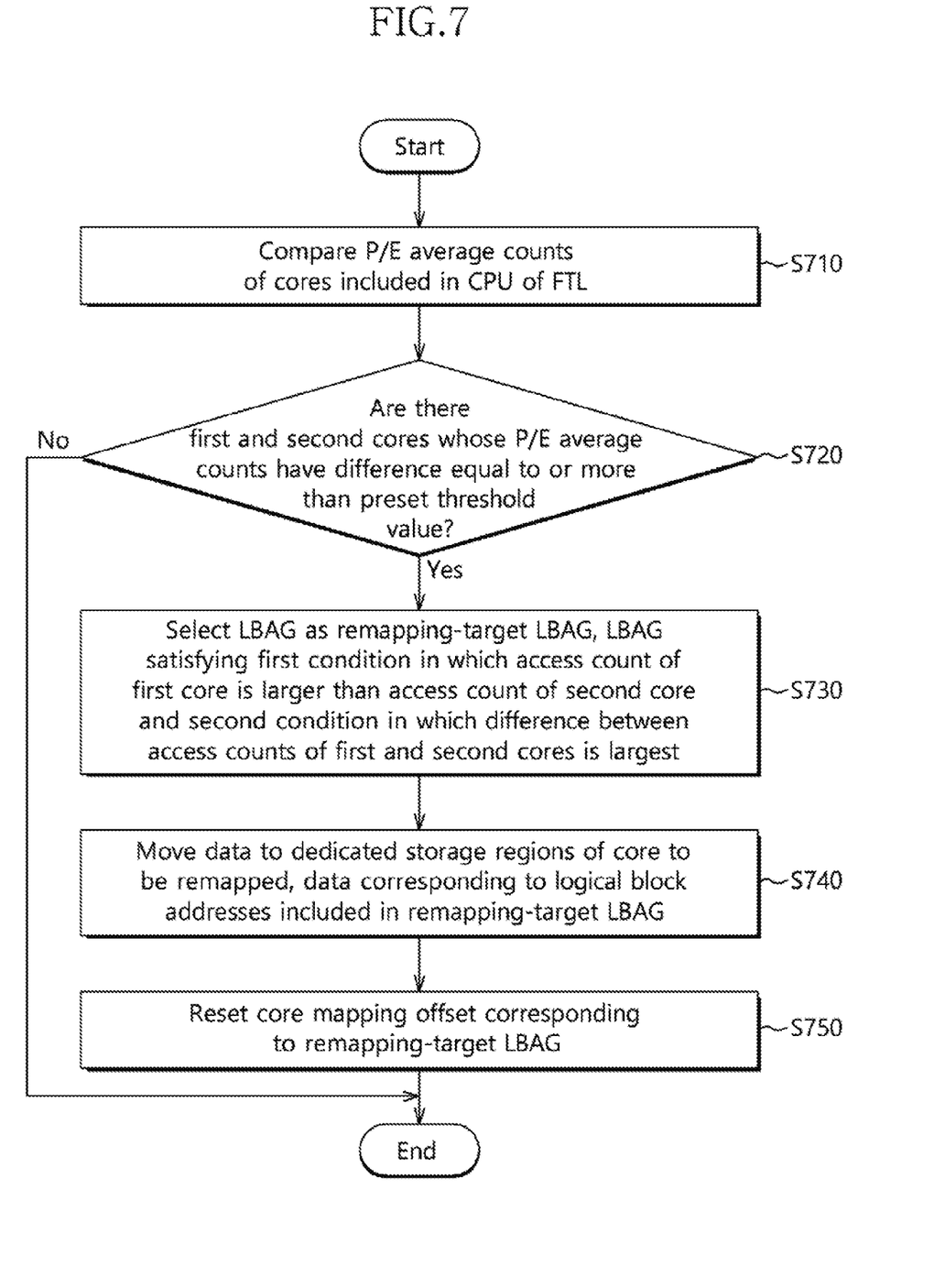
FIG. 7 is a flowchart illustrating an operating method of the data storage device in accordance with an embodiment.

FIG. 7 is a flowchart illustrating an operating method of the data storage device in accordance with an embodiment. While the operating method of the data storage device 10 in accordance with an embodiment is described with reference to FIG. 7, one or more of FIGS. 1 to 6 may be referred to.

In step S710, the first CPU 210 of the controller 200 may compare the P/E average counts of the plurality of cores Core 0 to Core i-1 by referring to the P/E average count table P/E ACT stored in the volatile memory 300 in each preset period.

In step S720, the first CPU 210 may determine whether there are first and second cores whose P/E average counts have a difference equal to or more than a preset threshold value, among the plurality of cores Core 0 to Core i-1. In an embodiment, suppose that the P/E average count of the first core is larger than the P/E average count of the second core, for convenience of description. When there are no first and second cores, the corresponding process may be ended. When there are the first and second cores, the process may proceed to step S730. In this step, when there are the first and second cores, the first CPU 210 may drive the remapping module 215 to perform steps S730 to S750.

In step S730, the remapping module 215 driven by the first CPU 210 may select a logical block address group as a remapping-target logical block address group LBAG by referring to the core access count table CACT stored in the volatile memory 300, the logical block address group satisfying a first condition in which the access count of the first core is larger than the access count of the second core and a second condition in which a difference between the access count of the first core and the access count of the second core is the largest.

In step S740, the remapping module 215 may provide the cores Core 0 to Core i-1 with an instruction for moving data to the dedicated dies or storage regions of a core to be remapped, the data being stored in physical block addresses corresponding to logical block addresses included in the remapping-target logical block address group, respectively. The cores Core 0 to Core i-1 may move the data to the dedicated dies of the core to be remapped, according to the instruction of the remapping module 215. When the data are completely moved, the process may proceed to step S750.

In step S750, the remapping module 215 may reset a core mapping offset which corresponds to the remapping-target logical block address group in the core mapping offset table CMOT. For example, the remapping module 215 may reset an offset from the source core (i.e. the first core) to the target core (i.e. the second core) to the core mapping offset of the remapping-target logical block address group.

In accordance with the present embodiments, the data storage device and the operating method thereof can perform wear-leveling among store regions for the respective cores by remapping logical block addresses mapped to the respective core, thereby equalizing the wear levels of the storage regions for the respective cores.

Figure 8:
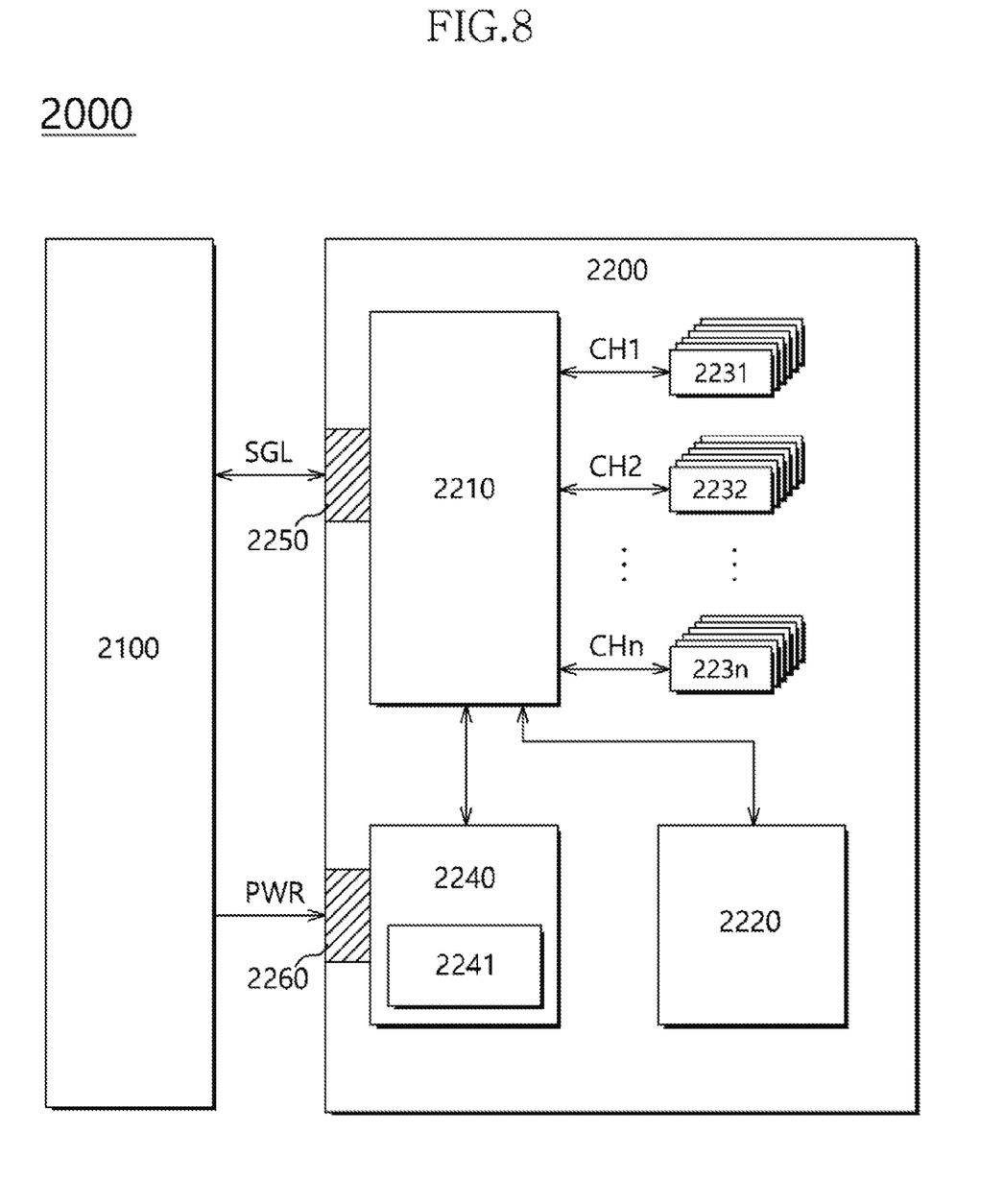
FIG. 8 illustrates a data processing system including a solid state drive (SSD) in accordance with an embodiment.

FIG. 8 illustrates a data processing system including a solid state drive (SSD) in accordance with an embodiment. Referring to FIG. 8, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 9:
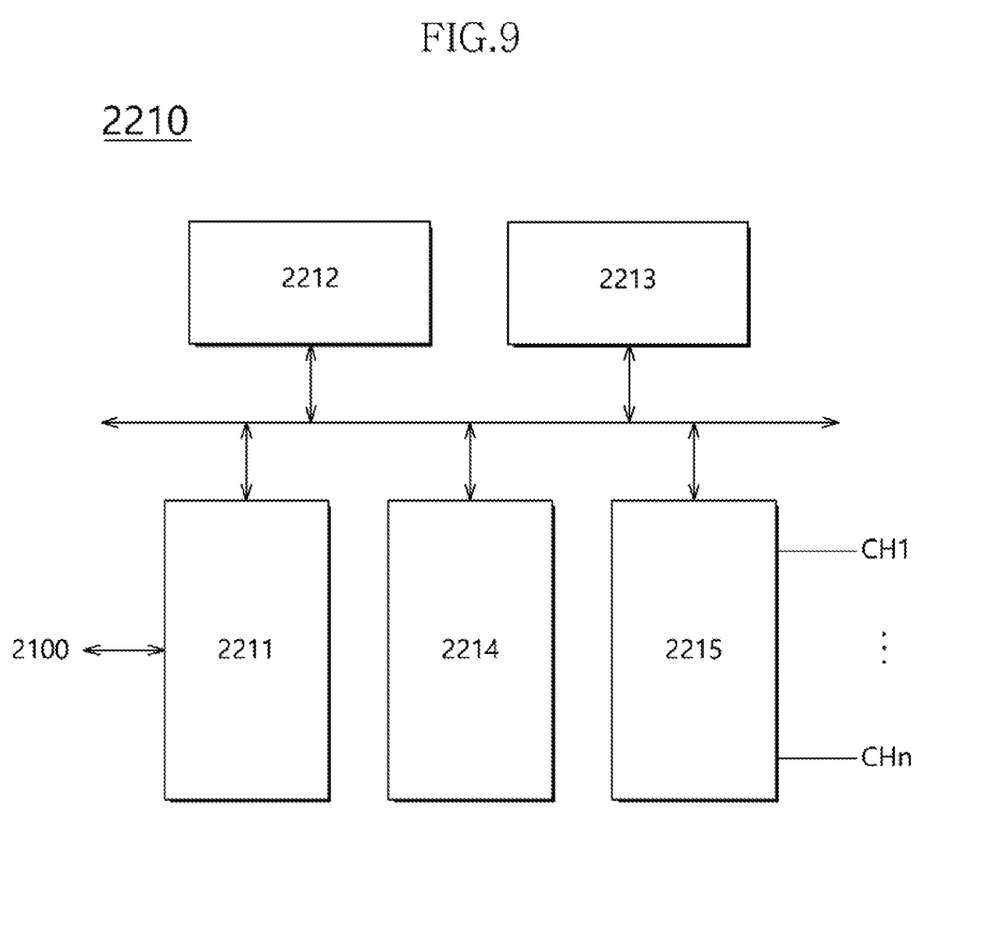
FIG. 9 illustrates a controller illustrated in FIG. 8.

FIG. 9 illustrates the controller 2210 of FIG. 8. Referring to FIG. 9, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223*n*. The generated parity data may be stored in the nonvolatile memory devices 2231 to 223*n* together with the data. The ECC unit 2214 may detect errors for data read from the nonvolatile memory devices 2231 to 223*n* based on the parity data. When detected errors are within a correctable range, the ECC unit 2214 may correct the detected errors.

The memory interface unit 2215 may provide a control signal such as a command and an address to the nonvolatile memory devices 2231 to 223*n* according to control of the control unit 2212. The memory interface unit 2215 may exchange data with the nonvolatile memory devices 2231 to 223*n* according to control of the control unit 2212. For example, the memory interface unit 2215 may provide data stored in the buffer memory device 2220 to the nonvolatile memory devices 2231 to 223*n* or provide data read from the nonvolatile memory devices 2231 to 223*n* to the buffer memory device 2220.

Figure 10:
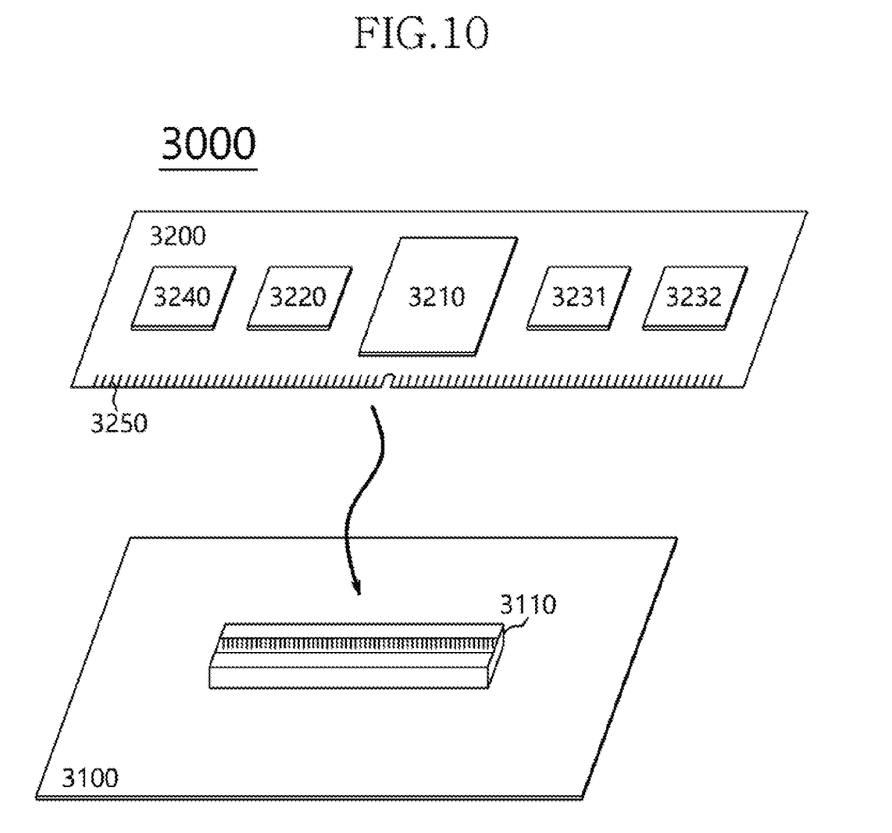
FIG. 10 illustrates a data processing system including a data storage apparatus in accordance with an embodiment.

FIG. 10 illustrates a data processing system including a data storage apparatus in accordance with an embodiment. Referring to FIG. 10, a data processing system 3000 may include a host apparatus 3100 and a data storage apparatus 3200.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 11:
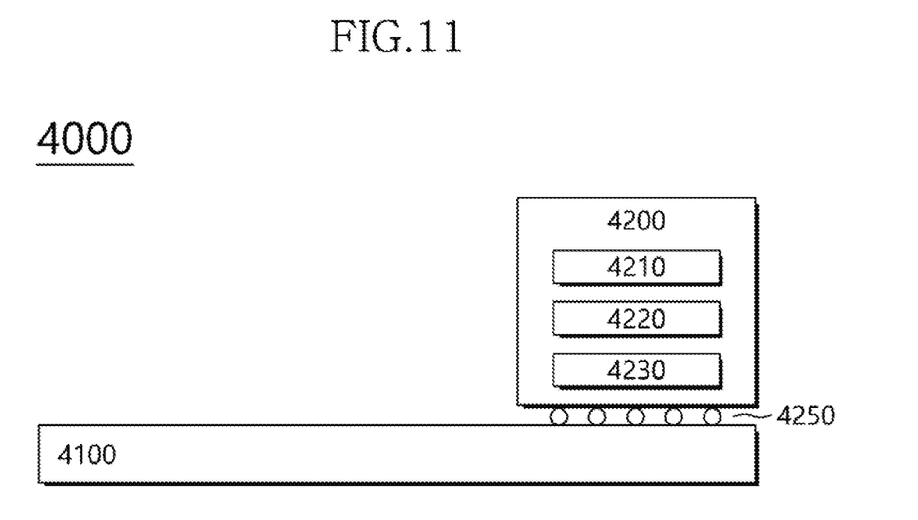
FIG. 11 illustrates a data processing system including a data storage apparatus in accordance with an embodiment.

FIG. 11 illustrates a data processing system including a data storage apparatus in accordance with an embodiment. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 12:
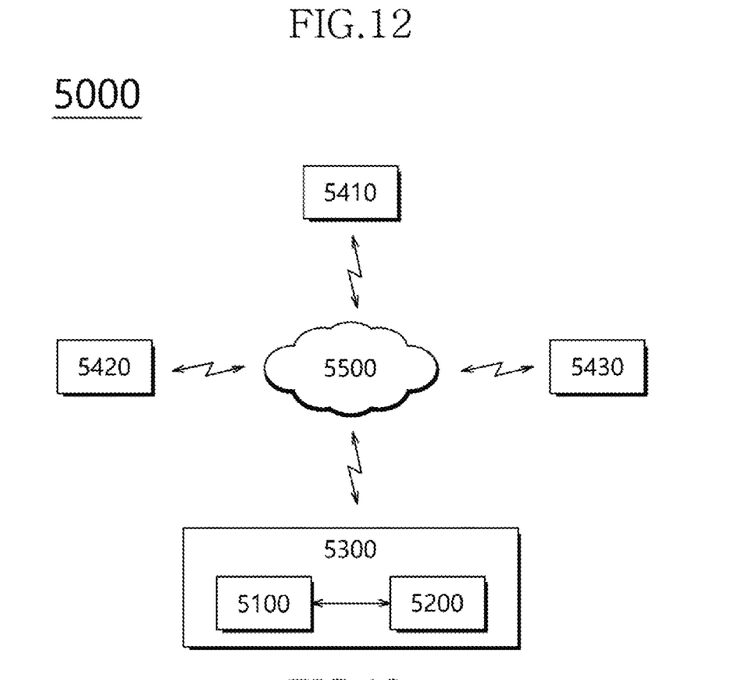
FIG. 12 illustrates a network system including a data storage apparatus in accordance with an embodiment.

FIG. 12 illustrates a network system 5000 including a data storage apparatus in accordance with an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the SSD 2200 of FIG. 8, the data storage apparatus 3200 of FIG. 10, or the data storage apparatus 4200 of FIG. 11.

Figure 13:
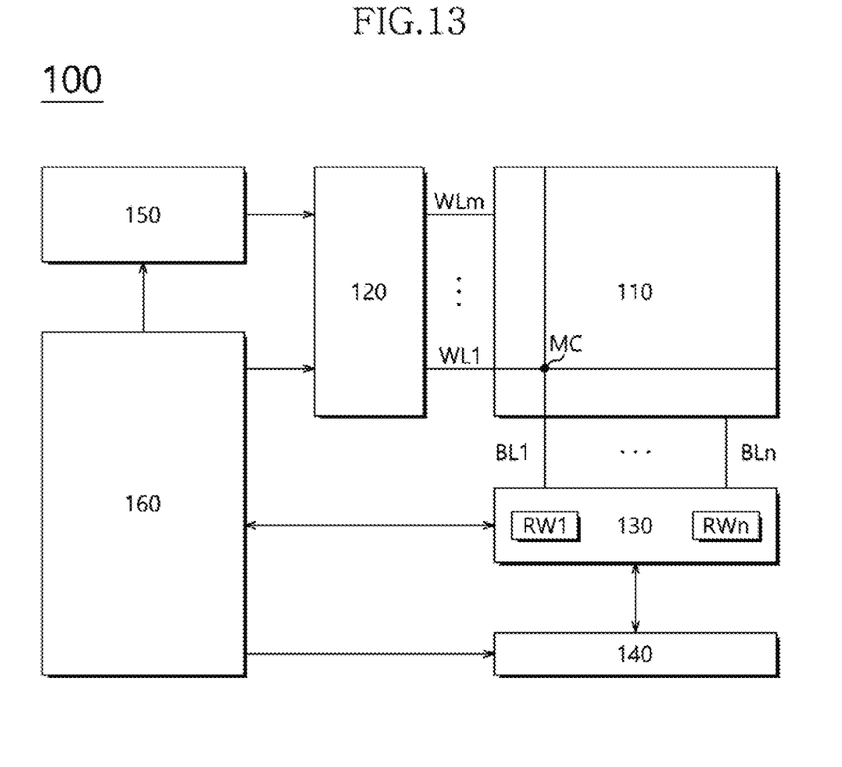
FIG. 13 illustrates a nonvolatile memory device included in a data storage apparatus in accordance with an embodiment.

FIG. 13 illustrates a nonvolatile memory device included in a data storage apparatus in accordance with an embodiment. Referring to FIG. 13, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the embodiments described are examples only. Accordingly, the data storage device and the operating method thereof, which have been described herein, should not be limited based on the described embodiments.

What is claimed is:

1. A data storage device comprising:
   a memory device; and
   a controller configured to control an operation of the memory device,
   wherein the controller comprises a first central processing unit (CPU) and a second CPU including a plurality of cores,
   wherein the first CPU compares P/E (Program/Erase) average counts for the plurality of cores of the second CPU, and performs a remapping operation of changing a core which is mapped to logical block addresses received from a host, when there is a first core and a second core, among the plurality of cores, that each have a P/E average count and a difference of the P/E average counts for the first core and the second core is equal to or more than a preset threshold value.

2. The data storage device according to claim 1, further comprising a memory,
   wherein the memory comprises:
   a P/E count table comprising the P/E average counts for the plurality of cores of the second CPU;
   a core access count table comprising per-core access counts for each of a plurality of logical block address groups; and
   a core mapping offset table comprising core mapping offsets for the respective logical block address groups.

3. The data storage device according to claim 2,
   wherein the memory device is a nonvolatile memory device, and
   wherein the memory is a volatile memory.

4. The data storage device according to claim 2, where the first CPU comprises a remapping module configured to perform the remapping operation.

5. The data storage device according to claim 4, wherein when there are the first and second cores among the plurality of cores of the second CPU, the first CPU drives the remapping module to perform the remapping operation.

6. The data storage device according to claim 4, wherein when the P/E average count of the first core is larger than the P/E average count of the second core, the remapping module selects a logical block address group as a remapping-target logical block address group among a plurality of logical block address groups by referring to the core access count table, the logical block address group satisfying a first condition in which the access count of the first core is larger than the access count of the second core and a second condition in which a difference between the access count of the first core and the access count of the second core is the largest.

7. The data storage device according to claim 6, wherein the remapping module resets the core mapping offset corresponding to the remapping-target logical block address group in the core mapping offset table.

8. The data storage device according to claim 7, wherein the remapping module resets the core mapping offset by changing the core mapping offset corresponding to the remapping-target logical block address group to an offset from the first core to the second core.

9. The data storage device according to claim 7, wherein before resetting the core mapping offset, the remapping module provides each of the cores of the second CPU with an instruction for moving data corresponding to logical block addresses included in the remapping-target logical block address group to a dedicated storage region of a core to be remapped.

10. The data storage device according to claim 9, wherein the plurality of cores of the second CPU move data to the dedicated storage region of the core to be remapped, according to the instruction provided from the remapping module, the data corresponding to one or more corresponding logical block addresses among the logical block addresses included in the remapping-target logical block address group.

11. An operating method of a data storage device which includes a memory device; and a controller configured to control an operation of the memory device and having a first central processing unit (CPU) and a second CPU including a plurality of cores, the operating method comprising:

comparing Program/Erase (P/E) average counts for the plurality of cores of the second CPU;

checking whether there is a first core and a second core, among the plurality of cores of the second CPU, that each have a P/E average count and a difference of the P/E average counts for the first core and the second core is equal to or more than a preset threshold value; and performing a remapping operation of changing a core which is mapped to logical block addresses received from a host, when there are the first core and the second core.

12. The operating method according to claim 11, wherein the performing of the remapping operation comprises, when the P/E average count of the first core is larger than the P/E average count of the second core:

selecting a logical block address group as a remapping-target logical block address group among a plurality of logical block address groups, the logical block address group satisfying a first condition in which the access count of the first core is larger than the access count of the second core and a second condition in which a difference between the access count of the first core and the access count of the second core is the largest; and resetting a core mapping offset corresponding to the remapping-target logical block address group.

13. The operating method according to claim 12, wherein the core mapping offset is an offset for deciding cores to be mapped to each of a plurality of logical block addresses included in each of the logical block address groups.

14. The operating method according to claim 13, wherein the resetting of the core mapping offset comprises changing the core mapping offset corresponding to the remapping-target logical block address group to an offset from the first core to the second core.

15. The operating method according to claim 12, further comprising moving data to a dedicated storage region of a core to be remapped, the data corresponding to logical block addresses included in the remapping-target logical block address group, before the resetting of the core mapping offset.

16. The operating method according to claim 11, wherein the memory device is a nonvolatile memory device.

* * * * *